United States Patent
Volftsun et al.

(10) Patent No.: US 11,161,729 B2
(45) Date of Patent: Nov. 2, 2021

(54) EMPTY KEG DETECTION FOR CARBONATED BEVERAGES

(71) Applicant: Sestra Systems, Inc., Sterling, VA (US)

(72) Inventors: Lev Volftsun, Sterling, VA (US); Alex Belfor, Sterling, VA (US); Deepak Harathi, Sterling, VA (US); Paras Goda, Sterling, VA (US)

(73) Assignee: SESTRA SYSTEMS INC., Sterling, VA (US)

( * ) Notice: Subject to any disclaimer, the term of this patent is extended or adjusted under 35 U.S.C. 154(b) by 163 days.

(21) Appl. No.: 16/503,681

(22) Filed: Jul. 5, 2019

(65) Prior Publication Data

US 2020/0055720 A1    Feb. 20, 2020

Related U.S. Application Data

(63) Continuation-in-part of application No. 15/424,478, filed on Feb. 3, 2017, now Pat. No. 10,167,183, and a continuation-in-part of application No. 15/487,488, filed on Apr. 14, 2017, now Pat. No. 9,926,181, which is a continuation-in-part of application No. 14/686,820, filed on Apr. 15, 2015, now Pat. No.
(Continued)

(51) Int. Cl.
*G01F 23/30* (2006.01)
*B67D 1/08* (2006.01)
*B67D 1/00* (2006.01)
*B67D 1/12* (2006.01)

(52) U.S. Cl.
CPC ......... *B67D 1/0878* (2013.01); *B67D 1/0004* (2013.01); *B67D 1/0888* (2013.01); *B67D 1/1272* (2013.01); *G01F 23/30* (2013.01); *B67D 2001/1261* (2013.01); *Y10T 137/7358* (2015.04)

(58) Field of Classification Search
CPC .... B67D 1/0004; B67D 1/272; B67D 1/0878; B67D 1/0888; G01F 23/30; Y10T 137/0385; Y10T 137/2984; Y10T 137/299; Y10T 137/7358
See application file for complete search history.

(56) References Cited

U.S. PATENT DOCUMENTS 8,561,842 B2 * 10/2013 Pizzacalla et al. ..... F16K 31/30
222/66
8,631,814 B2 * 1/2014 Hartmann ............ B67D 1/1247
137/192

(Continued)

*Primary Examiner* — Kevin L Lee
(74) *Attorney, Agent, or Firm* — Gugliotta & Gugliotta, LPA

(57) ABSTRACT

A system and method detection of an empty keg is provided. Carbonated beverages from a keg communicates a carbonated alcoholic beverage to a Foam on Beer (FOB) detector. The FOB forms a reservoir and containing a float. Level detection sensors in operative communication with the float identifies the position and movement of the float. An keg's status can thereby be anticipated by float level and speed changes. A the FOB status can thereby operate a touchless tap including a control valve via a tap control board (TCB) that actuates the control valve. A controller in operative communication with the TCB communicates with the control valve, the actuation button and in communication with the level sensor.

12 Claims, 6 Drawing Sheets

Related U.S. Application Data 10,125,002, application No. 16/503,681, filed on Jul. 5, 2019, which is a continuation-in-part of application No. 15/424,478, filed on Feb. 3, 2017, now Pat. No. 10,167,183, which is a continuation-in-part of application No. 15/332,117, filed on Oct. 24, 2016, now Pat. No. 10,294,092, application No. 16/503,681, filed on Jul. 5, 2019, which is a continuation-in-part of application No. 15/487,488, filed on Apr. 14, 2017, now Pat. No. 9,926,181, and a continuation-in-part of application No. 15/869,028, filed on Jan. 11, 2018, now Pat. No. 10,294,093.

(60) Provisional application No. 62/793,575, filed on Jan. 17, 2019, provisional application No. 62/695,213, filed on Jul. 9, 2018.

(56) References Cited

U.S. PATENT DOCUMENTS

| | | | | |
|---|---|---|---|---|
| 10,155,650 B2 * | 12/2018 | Petermann | ........... | B67D 1/1247 |
| 2021/0047169 A1 * | 2/2021 | Volftsun et al. | ..... | B67D 1/0888 |

* cited by examiner

EMPTY KEG DETECTION FOR CARBONATED BEVERAGES

RELATED APPLICATIONS

The present invention claims the benefit of U.S. Provisional Application No. 62/793,575 filed on 17 Jan. 2019 and is a Continuation in Part of the following related applications:

U.S. Provisional Application Non. 62/695,213 filed on 9 Jul. 2018;

U.S. Ser. No. 14/686,820, filed on Apr. 15, 2015 and issued as U.S. Pat. No. 10,125,002, which claimed the benefit of U.S. Provisional Application 62/023,899, filed on Jul. 13, 2014;

U.S. Ser. No. 15/332,117, filed on Oct. 24, 2016 and issued as U.S. Pat. No. 10,294,092;

U.S. Ser. No. 15/487,488, filed on Apr. 14, 2017 and issued at U.S. Pat. No. 9,926,181;

U.S. Ser. No. 15/424,478, filed on Feb. 3, 2017 and issued as U.S. Pat. No. 10,167,183; and U.S. Ser. No. 15/869,028, filed on Jan. 11, 2018 and issued as U.S. Pat. No. 10,294,093.

All of the above listed related applications are incorporated by reference as if fully rewritten herein.

BACKGROUND OF THE INVENTION

1. Field of the Invention

The present invention relates generally to an improved operation of the Beverage Dispensing System of the type described, taught or anticipated by or within the Related Applications or their equivalents and, more particularly, to a system and method for detecting an empty keg in a timely manner and to prevent excessive foaming or oxidation in the process.

2. Description of the Related Art

In the automated beverage dispensing systems of the Related Art, bulk alcoholic beverages such as wine have been successfully dispensed in a manner that meters, tracks, controls and continuous dispenses in a faster and more accurate manner. Such systems prevent oxidation of the beverage contents while allowing for necessary and routine delivery line cleaning through several mechanism.

Currently in use with conventional draught beer delivery systems are Foam On Beer (FOB) detectors. Such FOB devices generally utilize a radially expanded chamber within a beer delivery that is fitted with a float valve. In such a configuration when the float valve chamber is full of beer, the float valve floats in the liquid, thereby leaving the beer valve open and supplying beer to the taps. However, when foam or froth begins to develop in the chamber, the float valve is too heavy and will not float on the froth. It will consequently sink down to the beer outlet, closing it off and preventing the foam from entering the supply lines.

While such systems can and have been adapted for use with carbonated alcoholic beverages such as beer, sparkling wine or mixed cocktails, it has been found that a significant problem occurs prior to and during a changeover of a bulk beverage keg. As a keg becomes empty if the system pressure is allowed to drop the carbon dioxide gas will no longer remain within solution, resulting in a flat beverage. Further, if the system pressure is not maintained throughout the process, the connection of a new, full and high pressure keg will result in the first fluid into the system becoming excessively foamy.

One recent improvement with FOB technology is described in U.S. Pat. No. 8,631,814, issued in the name of Hartmann. The '814 patent describes a FOB type float valve opening mechanism in which a plurality of protrusions are provided on the lowermost end of the float. At least some of the protrusions engage the inside of the chamber so as to locate the float valve substantially in line with the chamber outlet. In this way, the float valve is guided into the correct location in the outlet by its own protrusions and therefore the flow control device does not require any further components in order to guide the float valve into the correct location in the chamber outlet to close off the flow of liquid from the chamber. This reduces the number of components and associated engagement pieces such as bores, recesses, screw-threads and the like within the chamber. This in turn facilitates an increase in hygiene within the FOB by reducing the number of areas where bacteria can accumulate and further makes the FOB easier to clean. Additionally, there remains space surrounding the float valve through which the beer may flow.

However, while improvements directed to more streamlined internal flow profiles are certainly advantageous, they still fail to prevent the undesired decrease in pressure when a keg is replaced during a changeover.

Consequently, a need still exists to maintain the system pressure throughout the process of connecting of a new, full and high pressure keg. As such, a system and method for anticipatory detection of an empty keg of carbonated beverage that actively seals the delivery system during a changeover are required and would be advantageous.

SUMMARY OF THE INVENTION

It is thus an object of the present invention to provide a system and method for detecting an empty keg in a manner that anticipates keg changeover.

It is a further object of the present invention to provide to provide a system and method for changing of carbonated beverage kegs in an automated dispensing system that prevents excessive foaming after changeover within the system.

It is a feature of the present invention to improve an automated bulk beverage dispensing system that prevents a loss of system pressure during a changeover.

Briefly described according to the present invention, the detection of an empty keg is identified during dispensing of carbonated beverages. A system for dispensing carbonated beverages from a keg containing a carbonated alcoholic beverage that is pressurized by a pressurized tank of gas includes a first delivery line for communicating the carbonated alcoholic beverage to a Foam on Beer (FOB) detector. The FOB forms a reservoir or chamber into which the liquid is dispensed and containing a float. A level detector in operative communication with the float identifies a level of said float. An empty keg is identified when the float level within the FOB moves downward. Upward movement of the float indicates when a new keg is implemented. A second delivery line communicates the carbonated alcoholic beverage to a touchless tap. The touchless tap includes a control valve, a tap control board (TCB) that actuates the control valve, and an actuation button for initiating the dispensing of a pour. A controller in operative communication with the TCB via a Controller Area Network (CAN bus) communicates with the control valve, the actuation button and in communication with the level sensor.

The tap may further provide an integrated pneumatic actuator casing forming a dispensing shaft that is opened or closed via a pneumatic valve, with the shaft and pneumatic valve having a connected or contiguous form factor. The tap shaft is further adapted to facilitate venting of beer from a spout independent of spout orientation.

It is an advantage of the present system and method allows for early detection of an empty keg when dispensing carbonated beverages such that the system tap can be immediately closed. By detecting an empty keg in a timely manner, an automated touchless tap may be closed to prevent forming a foam in the line between FOB and the tap. By maintaining system pressure, waste is eliminated and poor customer experiences (through excessive foaming of beverages) is reduced. Further, additional automation such as the triggering of empty keg alerts may be implemented to notify the staff that a new keg should be connected.

Further objects, features, elements and advantages of the present invention will become readily apparent from the following detailed description of the preferred embodiment when considered with the attached drawings and the appended claims.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
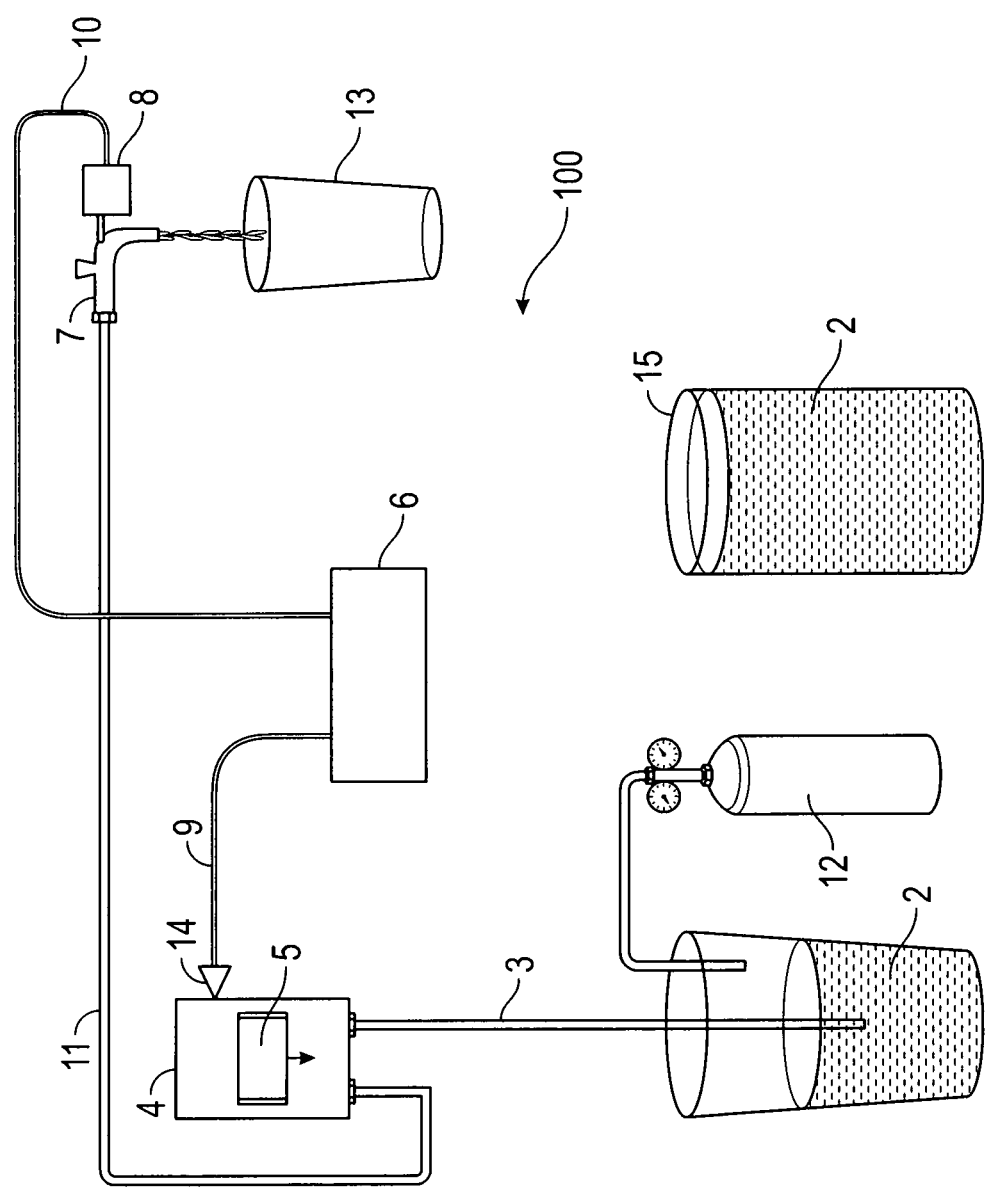
FIG. 1 is a schematic flow diagram of an improved beverage dispensing system having an automated touchless tap according to the preferred embodiment of the present invention.
Figure 2:
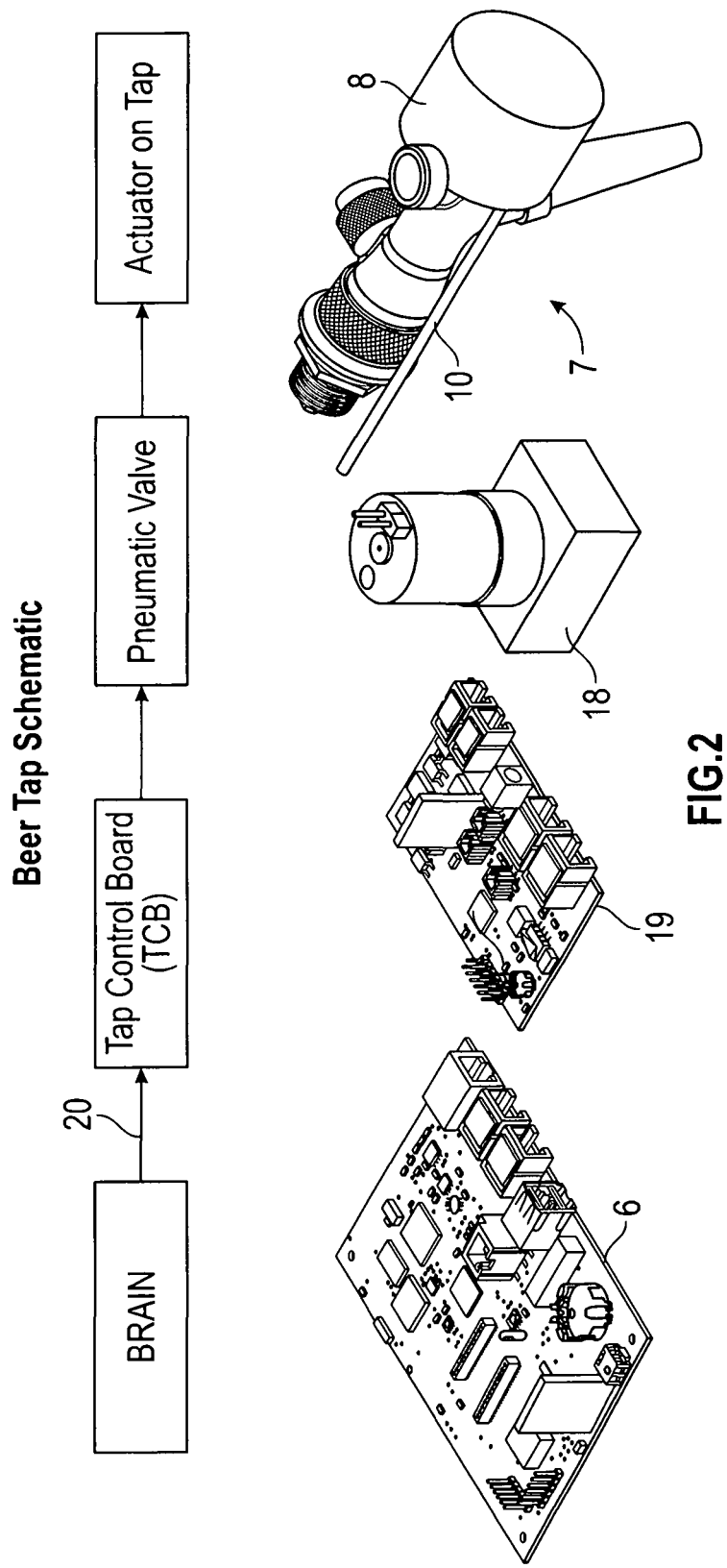
FIG. 2 is a schematic of a beer tap system for use therewith.
Figure 3:
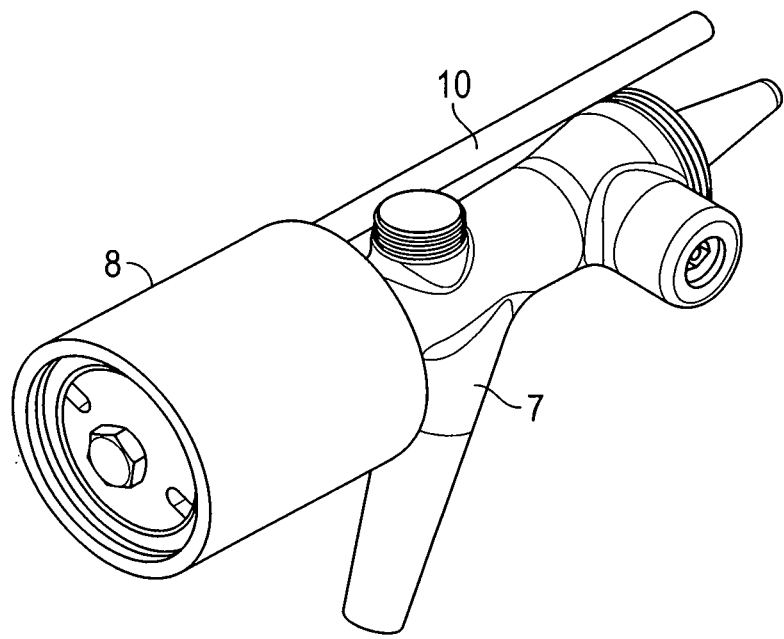
FIG. 3 is a perspective view of a touchless tap handle for use therewith.
Figure 4:
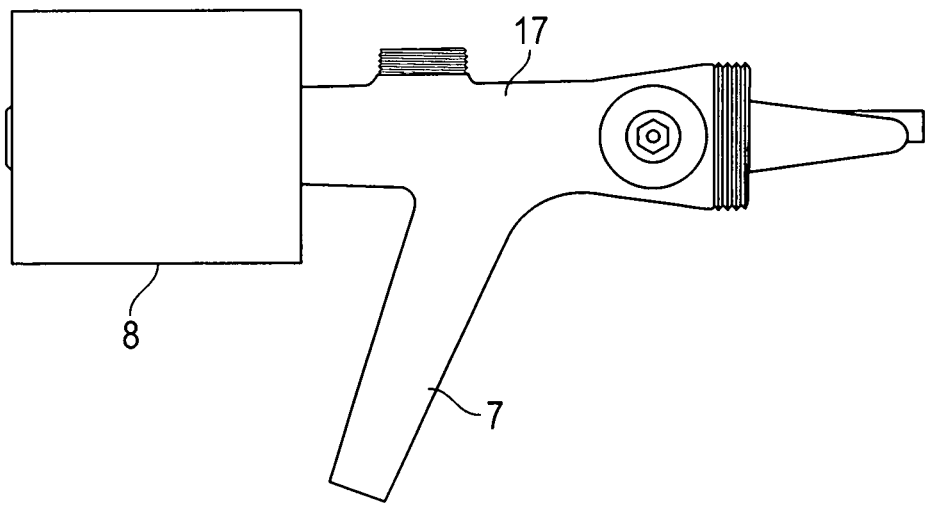
FIG. 4 is a side elevational view thereof.
Figure 5:
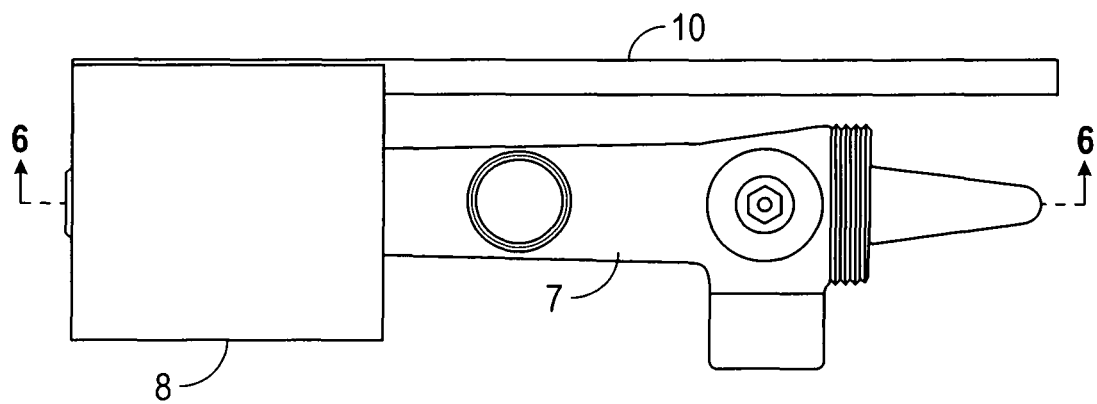
FIG. 5 is a top plan view thereof.
Figure 6:
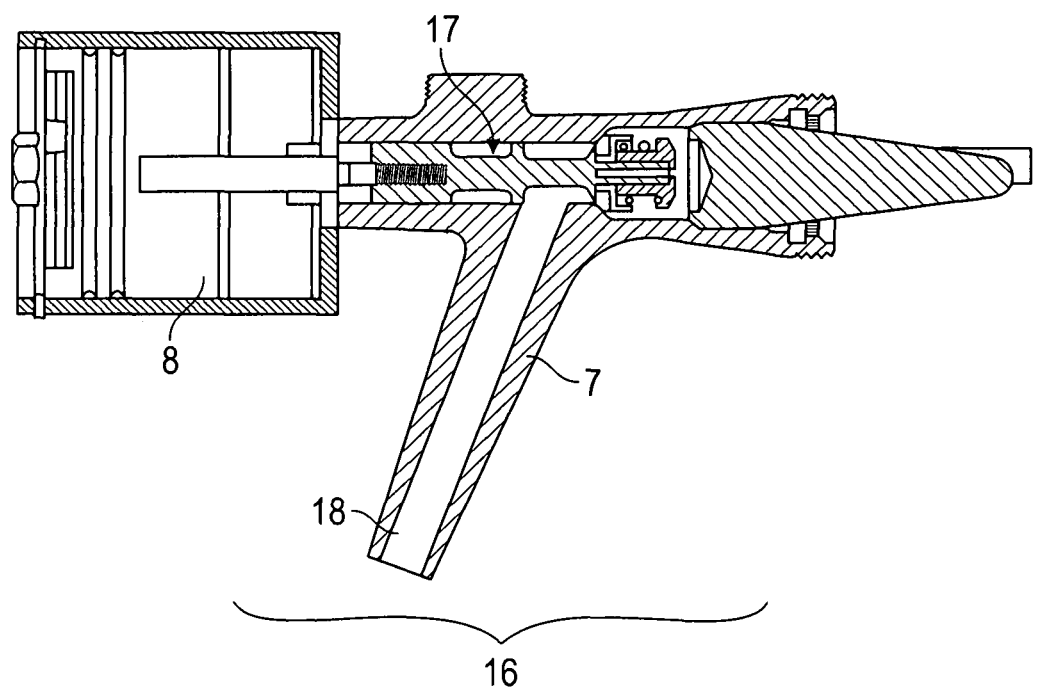
FIG. 6 is a cross sectional view taken along line C-C of FIG. 5.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Before explaining the present invention in detail, current systems for dispensing bulk keg beverages may be exemplified by present systems where beer is delivered from a cooler to a point of dispensing through a beer conduit such as an insulated bundle combining beer lines and coolant lines. In such systems, the beer is propelled by gas pressure applied over the beer in the keg. The keg is said to "kick" as it empties, when the level of the liquid beer falls below the discharge outlet in the keg. When this occurs, a frothy mixture of propellant gas and residual beer are blown out through the beer lines or hoses. When this happens, it causes at best an erratic, unsatisfactory, gassy pour of the residue that is difficult or impossible to control at the tap. To resume satisfactory dispensing of liquid beer, the lines must be repacked, refilled with beer and the gas displaced.

In order to attempt to minimize "keg kick", various designs of foam traps (also known as "foam trap", a "foam on beer" detectors or "FOBs"), are presently in commercial use to prevent the entrance of excessive foam into the distribution lines as the keg hits empty. Most FOB devices use a float to seal the outlet of a reservoir to which the beer lines are attached when the level of liquid in the reservoir falls low. While such systems may minimize the "kick" as the keg is emptied, it fails to address the problems caused for the first pours from the replacement kegs by lowered system pressures.

While the present invention addresses the inherent problems with cost, operation, sanitation, reliability or maintenance of such systems, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Referring now to FIG. 1 through FIG. 6, wherein like reference numerals indicate the same parts throughout the several views, an empty keg detection system for carbonated beverages, generally noted as 20, is shown according to the preferred embodiment of the present invention. As shown best in conjunction with FIG. 1, the system 100 utilizes a bulk keg 1 containing a carbonated alcoholic beverage 2 that is pressurized by a pressurized tank of gas 12. A first delivery line 3 communicates the beverage 2 to a foam trap or FOB 4 which forms a reservoir or chamber into which the liquid is dispensed. The chamber contains a float 5 and further communicates the beverage through a second delivery line 11 to a touchless tap handle 7 which dispensed directly to a serving container 13.

The tap handle 7 contains a control valve. A system controller 6 communicates with and controls the valve 8 with a first communication cable 10. Further, the system controller 6 communicates with a level sensor 14 positioned along the FOB 4 with a second communication cable 9.

Referring now in conjunction with FIG. 2 through FIG. 6, a preferred embodiment of the touchless tap 7 is shown in greater detail. The tap 7 may include the valve 8 in the form of an integrated pneumatic actuator casing 16. The casing 16 may include a shaft 17 that facilitates venting of beer from a spout 18 regardless of its orientation. With such an improvement, the tap 7 doesn't need to be installed in a particular position in order to operate appropriately, which is unlike existing tap dispenser in which the dispensing shaft must be oriented in a limited orientation for proper functioning.

It is envisioned that the tap 7 may incorporate a universal fit configuration that may fit with current major beer tap shanks (e.g., Perlick, Micromatic, etc.)

The integrated pneumatic actuator casing 16 may incorporate the pneumatic actuator 8 in an integrated form factor. A pneumatic valve 18 driven by the actuator 8 may be electronically actuated by a tap control board (TCB) 19 that is operatively controlled by the controller 6. It is anticipated that when a user pushes a button to actuate the dispensing of a pour, the controller 6 may send a control signal to the TCB. Controller Area Network (CAN bus) 20 may be used to allow the controller 6 to communicate with the TCB 19, as well as to any other a host computers. A message-based protocol may be communicated through cables 9, 10, which may include multiplex electrical wiring.

Figure 7:
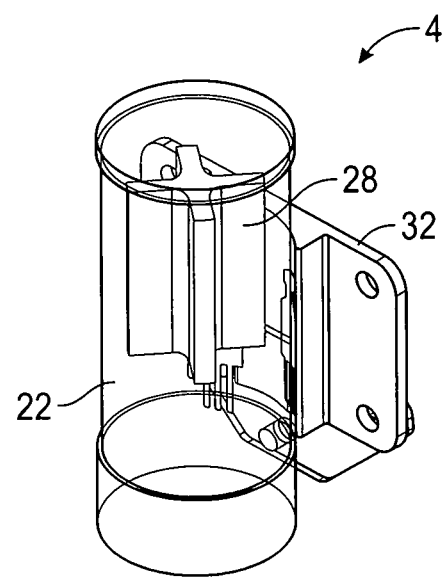
FIG. 7 is a perspective view of a Foam On Beer controller 4 for use with the improved beverage dispensing system having an automated touchless tap according to the preferred embodiment of the present invention.
Figure 8:
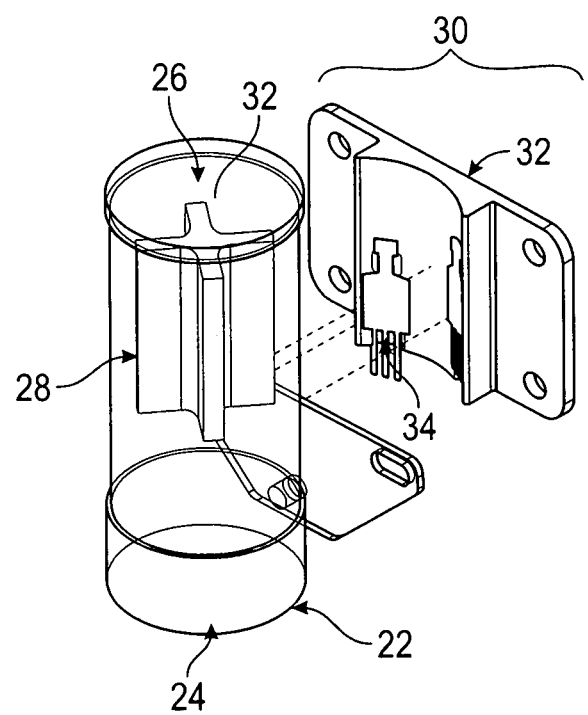
FIG. 8 is an exploded perspective view thereof.
Figure 9:
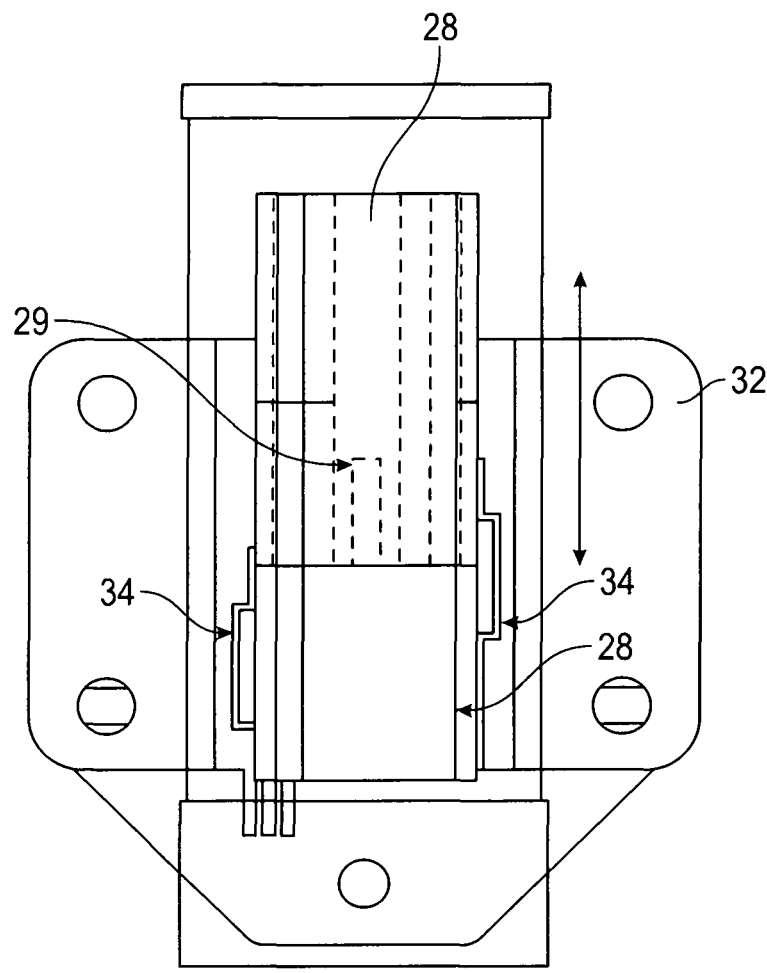
FIG. 9 is a front elevational schematic thereof showing its internal operation.

Referring now in conjunction with FIG. 7 through FIG. 9, a preferred embodiment of the FOB 4 incorporating a sensor controller assembly 30 is shown in greater detail. The FOB 4 includes a float chamber 22 having a lower inlet 24 for receiving pressurized liquid into an upper outlet 26 for discharging the pressurized liquid. The chamber 22 may form a radially expanded housing, as compared with a beverage supply or discharge line (not shown) such as to form an internal volume sufficient to retain a float valve 28. The float valve 28 may include a magnetic target 29 for use in conjunction with the sensor control assembly 30 as described in greater detail below. The float valve 28 may include a number of guides or vanes 32 that may guide the float to be movable to and from a normal upper position wherein the chamber inlet 24 is open to liquid flow and a lower, foam detection position wherein the float 28 becomes immersed in a liquid/foam mixture having a lower specific gravity that both the normal liquid flow as well as that of the float 28 itself. The vanes or guides 32 may allow for fluid flow through the chamber 22 while providing alignment and orientation of the float 28 within the chamber and thereby maintain a known path and trajectory for the magnetic target 29.

The sensor control assembly 30 may include a sensor mounting plate 32 to allow for coordination of assembly between the float chamber 22 and a sensor assembly 34. As shown herein a plurality of individual sensors 34 may be provided for operational redundancy. The sensors 34 are used to detect the position of the float 28, as well as movement of the float 28 within the chamber 22. In order to provide a non-contact detection of movement and location regardless of liquid translucence and viscosity, the sensors 34 may be magnetic flux sensors placed strategically in a non-invasive manner on the mounting plate 32. While one having ordinary skill in the relevant art, in light of the present teachings, may be provided for any number of equivalent or similar sensor types or styles, in the preferred embodiment it is felt that one of two main types of sensors may be used, namely, Hall effects and Magneto resistive. In any equivalent embodiment, the sensors 34 are utilized to obtain a non-binary representation of the exact location of the float 28. Two sensors 34 placed across the plane of movement will allow a weak strength but light magnet 29 inside the float 28 to be detected. It is intended that light weight magnets 29 may be utilized in order to maintain the buoyancy of the float 28.

Output of the sensors 34 may be connected to an analog to digital converter, located either at the controller 6 or separably within the sensor assembly 34 or sensor control assembly 30. The sensors 34 may thereby obtain discreet values indicating the polarity and magnetic flux strength. With this non-binary information, it is possible to determine the extract location, velocity and acceleration of float 28 as it moves through the FOB 7. Additionally, any stationary position may similarly be determined

2. Operation of the Preferred Embodiment

In operation system 100 will allow the detection of an empty keg 1 when dispensing carbonated beverages 2. Once an empty keg 1 is detected the valve 8 of the tap 7 can be immediately closed. During normal operation, high pressure in the keg 1 pushes the beverage 2 through line 3 into FOB 4 and then through line 11 to be dispensed by Touchless Tap 7 into container 13. The touchless tap 7 contains a built-in pneumatic (or other type) valve 8 that opens and closes the tap in response to commands received from controller 6. The controller communicates with the tap via cable 10.

During the normal operation, a carbonated beverage 2 flowing from the keg 1 forces float 5 inside FOB 4 into the up position, allowing beer to flow to the tap 7. When a keg 1 empties, the float 5 drops down stopping the flow of beverage 2 from the keg 1. The sensor 14 attached to FOB 4 will detect up and down movements of float 5 and communicate these events to the controller 6 via cable 9. When the keg 1 is almost empty, a mix of a gas and a beverage will enter FOB 4 which will cause the float 5 to start moving down to the bottom of the FOB 4. When the sensor 14 detects the downward movement of the float 5, (anticipating an empty keg) the controller 6 sends a command to tap 7 to close valve 8 and indicates that the tap 7 as inactive (which prevents the opening of the valve 8) until a new keg 15 is installed. It is important to note that controller 6 initiates valve closing before the FOB float 5 moves all way down. An early closing of valve 8 preserves the pressure in line 10 and prevents forming of a foam therein.

In addition, the controller 6 may record the volume of the beverage 2 dispensed prior to detecting an empty keg 1 so that when a new keg 15 is installed the system 100 can resume dispensing the serving 13 that was interrupted by the empty keg 1. The serving size of the first serving from the new keg may be calculated with taking into account the recorded volume of the last serving.

When sensor 14 detects that the float 5 moved up (indicating a new keg 15 has been installed and the pressure in line 11 is restored) the controller 6 reclassify this tap 7 as active and enable the dispensing system 100 to initiate a next pour when requested.

By detecting an empty keg 1 in a timely manner, foam is prevented from forming in the line 11 between FOB 4 and the tap 7. This eliminates waste and bad customer experiences. Further, by triggering empty keg alerts to notify the staff, new kegs may be connected in a timely manner to prevent excessive "down time" of the system 100.

Further, the inclusion of the sensor enables FOB 4 provides such sensor output data that may be used with algorithms to detect peaks and troughs, trigger off of thresholds and analyze sinusoidal curves when a magnetic float is within sensing range of the sensors 34. When using one or several proximity sensors (for example, Hall sensors), a determination of float position may be made versus time, thereby allowing for calculation of the float speed and acceleration. The determination of all such position and movement data allows for controlled action to be made concerning a dispense system's status. The fast float drop for example indicates the empty keg requiring the system to close the remote tap immediately; small float fluctuations near the FOB top could mean the leaking keg tap, wrong beverage temperature and/or pressure. Each float kinematic pattern along with additional data from other sensors could be analyzed to generate the informational message to the user making it easier to fix the problem fast and increase productivity.

By sensing changes at the FOB that is located near the keg 2, the remote controlling of the flow of the tap 7 may be facilitated. The tap 7 may be tens of feet away in a long draw beer system. Even in such remote situations, pressure is maintained in the entire line, reducing waste thanks to detectable issues in the system.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this Provisional Patent Application.

The invention claimed is:

1. A system for dispensing carbonated beverages from a bulk keg comprising:
   a keg containing a carbonated alcoholic beverage that is pressurized by a pressurized tank of gas;
   a first delivery line for communicating the carbonated alcoholic beverage to a Foam on Beer (FOB) detector;
   said FOB forming a reservoir or chamber into which the liquid is dispensed and containing a float;
   a level detector in operative communication with said float and adapted to identify a level of said float;
   a second delivery line for communicates the carbonated alcoholic beverage from a tap for dispensed a pour directly to a serving container;
   said tap further comprising:
      a control valve;
      a tap control board (TCB) that actuates the control valve; and
      an actuation button for initiating the dispensing of the pour; and
   a controller in operative communication with the TCB via a Controller Area Network (CAN bus), said controller in operational communicates with the control valve, the actuation button and in communication with the level detector.

2. The system of claim 1, wherein said tap comprises:
   an integrated pneumatic actuator casing forming a dispensing shaft that is opened or closed via said control valve comprising a pneumatic valve, said shaft and said pneumatic valve having a connected or contiguous form factor.

3. The system of claim 2, wherein the shaft is adapted to facilitates venting of beer from a spout independent of spout orientation.

4. The system of claim 1, further comprising:
   said tap control board (TCB) that actuates the control valve and is operatively controlled by the controller;
   the actuation button for initiating the dispensing of a pour; and
   the controller in operative communication with the TCB via a Controller Area Network (CAN bus).

5. A method for dispensing carbonated beverages from a bulk keg utilizing a system of claims 1 comprising:
   a. detection of an empty keg; and
   b. closing valve of the tap upon empty keg detection in a manner that preserve pressure in a dispensing line.

6. The method of claim 5, wherein said detection of an empty keg comprises identifying a float level within the FOB, wherein detection of up and down movements of the float is communicated to the controller via cable and wherein:
   downward movement of the float indicates when the keg is emptying; and
   upward movement of the float indicates when a new keg is implemented.

7. The system of claim 2, further comprising:
   the tap control board (TCB) that actuates the control valve and is operatively controlled by the controller;
   the actuation button for initiating the dispensing of a pour; and
   the controller in operative communication with the TCB via a Controller Area Network (CAN bus).

8. A method for dispensing carbonated beverages from a bulk keg utilizing a system of claims 7 comprising:
   a. detection of an empty keg; and
   b. closing valve of the tap upon empty keg detection in a manner that preserve pressure in a dispensing line.

9. The method of claim 8, wherein said detection of an empty keg comprises identifying a float level within the FOB, wherein detection of up and down movements of the float is communicated to the controller via cable and wherein:
   downward movement of the float indicates when the keg is emptying; and
   upward movement of the float indicates when a new keg is implemented.

10. The system of claim 3, further comprising:
    the tap control board (TCB) that actuates the control valve and is operatively controlled by the controller;
    the actuation button for initiating the dispensing of a pour; and
    the controller in operative communication with the TCB via a Controller Area Network (CAN bus).

11. A method for dispensing carbonated beverages from a bulk keg utilizing a system of claims 10 comprising:
    a. detection of an empty keg; and
    b. closing valve of the tap upon empty keg detection in a manner that preserve pressure in a dispensing line.

12. The method of claim 11, werein said detection of an empty keg comprises identifying a float level within the FOB, wherein detection of up and down movements of float is communicated to the controller via cable and wherein:
    downward movement of the float indicates when the keg is emptying; and
    upward movement of the float indicates when a new keg is implemented.

* * * * *